(12) United States Patent
Li (10) Patent No.: US 10,047,890 B2
(45) Date of Patent: *Aug. 14, 2018

(54) QUICK CONNECTION COUPLING (71) Applicant: AS IP Holdco, LLC, Piscataway, NJ (US)

(72) Inventor: Hsiao Chang Li, Edison, NJ (US)

(73) Assignee: AS IP Holdco, LLC, Piscataway, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/194,196

(22) Filed: Jun. 27, 2016

(65) Prior Publication Data

US 2016/0305590 A1  Oct. 20, 2016

Related U.S. Application Data (63) Continuation of application No. 13/328,900, filed on Dec. 16, 2011, now Pat. No. 9,376,789.

(Continued)

(51) Int. Cl.
*F16L 37/138* (2006.01)
*E03C 1/02* (2006.01)

(52) U.S. Cl.
CPC ............ *F16L 37/138* (2013.01); *E03C 1/021* (2013.01); *Y10T 137/9464* (2015.04)

(58) Field of Classification Search
CPC .... F16L 37/138; F16L 37/05; Y10T 137/9496

(Continued)

(56) References Cited

U.S. PATENT DOCUMENTS 638,611 A    12/1899  Totham
1,434,401 A  11/1922  Mueller
(Continued)

FOREIGN PATENT DOCUMENTS

CA    2638466 A1    2/2010
CN    200952621 Y   9/2007
(Continued)

OTHER PUBLICATIONS

First Chinese Office Action and translation thereof in Chinese Application No. 201210018359.2 (counterpart of Parent U.S. Appl. No. 13/328,900), dated Mar. 9, 2015 (total 19 pages).

(Continued)

*Primary Examiner* — David Bochna
*Assistant Examiner* — James A Linford
(74) *Attorney, Agent, or Firm* — Morrison & Foerster LLP (57) ABSTRACT

A coupling, conduit assembly, method for coupling conduits and faucet assembly are described herein, wherein the coupling includes a female section with a conduit connecting end and a retainer with at least one projection; a male section with a conduit connecting end and a male projecting portion with a two large diameter sections, each having an inwardly facing surface wherein the surfaces define a channel that is configured so a mating surface on the projection or projections contacts the surface of the first large diameter section when the coupling is locked; and a locking piece on the female section capable of sliding along that section to engage the projection or projections when situated in the channel so the mating surface on the projection or projections contacts the surface of the first large diameter section and the locking piece retains the projection or projections in position and locks the coupling.

7 Claims, 8 Drawing Sheets

Related U.S. Application Data (60) Provisional application No. 61/450,221, filed on Mar. 8, 2011.

(58) Field of Classification Search
USPC .................. 285/315, 316, 319, 322, 82, 86
See application file for complete search history.

(56) References Cited

U.S. PATENT DOCUMENTS

| | | | |
|---|---|---|---|
| 1,475,907 A | 11/1923 | Volman | |
| 2,374,309 A | 4/1945 | Roxs | |
| 2,503,364 A | 4/1952 | Viets | |
| 2,634,944 A | 4/1953 | Waite | |
| 2,691,912 A | 10/1954 | Jones | |
| 2,784,987 A | 3/1957 | Corcoran | |
| 3,175,435 A | 3/1965 | Pollack | |
| 3,339,944 A * | 9/1967 | Poague | F16L 37/0985 285/315 |
| 3,599,260 A | 8/1971 | Lesh | |
| 3,695,139 A | 10/1972 | Howe | |
| 3,780,758 A | 12/1973 | DeVries | |
| 3,834,416 A | 9/1974 | Parkison | |
| 4,275,907 A | 6/1981 | Hunt | |
| 4,281,857 A | 8/1981 | Randall | |
| 4,288,113 A | 9/1981 | Saulnier | |
| 4,451,069 A | 5/1984 | Melone | |
| 4,502,165 A | 3/1985 | Szemeredi et al. | |
| 4,659,273 A | 4/1987 | Dudley | |
| 4,793,375 A | 12/1988 | Marty | |
| 4,889,368 A | 12/1989 | Laipply | |
| 4,890,964 A | 1/1990 | Lindley et al. | |
| 4,895,570 A | 1/1990 | Larkin | |
| 4,915,421 A | 4/1990 | Dennany, Jr. | |
| 5,027,671 A | 7/1991 | Erikson et al. | |
| 5,029,904 A | 7/1991 | Hunt | |
| 5,054,743 A | 10/1991 | Norkey et al. | |
| 5,087,081 A | 2/1992 | Yoon | |
| 5,100,275 A | 3/1992 | Schirrmacher | |
| 5,127,438 A | 7/1992 | Williams | |
| 5,141,372 A | 8/1992 | Donner | |
| 5,176,050 A | 1/1993 | Sauer et al. | |
| 5,297,458 A | 3/1994 | Smith | |
| 5,398,717 A | 3/1995 | Goncze | |
| 5,402,827 A | 4/1995 | Gonzalez | |
| 5,417,242 A | 5/1995 | Goncze | |
| RE35,545 E | 7/1997 | Chrysler | |
| 5,725,008 A | 3/1998 | Johnson | |
| 5,822,811 A | 10/1998 | Ko | |
| 5,908,163 A | 6/1999 | Wells | |
| 5,944,467 A | 8/1999 | Yuta | |
| 5,946,746 A | 9/1999 | Bloom | |
| 5,979,777 A | 11/1999 | Ems | |
| 5,983,917 A | 11/1999 | Thomas | |
| 6,073,647 A | 6/2000 | Cook et al. | |
| 6,073,972 A | 6/2000 | Rivera | |
| 6,085,784 A | 7/2000 | Bloom et al. | |
| 6,202,685 B1 | 3/2001 | Neumair | |
| 6,209,153 B1 | 4/2001 | Seglen, Jr. | |
| 6,231,089 B1 | 5/2001 | DeCler et al. | |
| 6,240,798 B1 | 6/2001 | Erikson et al. | |
| 6,250,692 B1 | 6/2001 | Ito et al. | |
| 6,263,919 B1 | 7/2001 | Knapp | |
| 6,299,215 B1 | 10/2001 | Kirby | |
| 6,361,260 B1 | 3/2002 | Schirrmacher | |
| 6,405,749 B2 | 6/2002 | Bloom et al. | |
| 6,434,765 B1 | 8/2002 | Burns | |
| 6,488,320 B1 | 12/2002 | Anderson | |
| 6,497,433 B1 | 12/2002 | Ketcham | |
| 6,631,730 B1 | 10/2003 | Bloom et al. | |
| 6,672,628 B2 | 1/2004 | Thomas et al. | |
| 6,678,903 B1 | 1/2004 | Rhodes | |
| 6,684,906 B2 | 2/2004 | Burns et al. | |
| 6,786,516 B2 | 9/2004 | Cronley | |
| 6,880,587 B1 | 4/2005 | Carter et al. | |
| 7,003,818 B2 | 2/2006 | McNerney et al. | |
| 7,077,153 B2 | 7/2006 | Segien, Jr. | |
| 7,077,382 B2 | 7/2006 | Klinger | |
| 7,108,011 B1 | 9/2006 | Lodahl et al. | |
| 7,140,645 B2 | 11/2006 | Cronley | |
| 7,165,570 B1 | 1/2007 | Lordahl et al. | |
| 7,174,581 B2 | 2/2007 | McNerney et al. | |
| 7,179,038 B2 | 2/2007 | Reindl | |
| 7,273,070 B2 | 9/2007 | Lin | |
| 7,306,005 B2 | 12/2007 | Moldthan | |
| 7,338,242 B2 | 3/2008 | Ellis et al. | |
| 7,658,202 B2 | 2/2010 | Mueller et al. | |
| 7,886,372 B2 | 2/2011 | Jacobs | |
| 8,231,318 B2 | 7/2012 | Pitsch et al. | |
| 8,490,276 B2 | 7/2013 | Julian | |
| 8,689,818 B2 | 4/2014 | Marty et al. | |
| 9,169,629 B2 | 10/2015 | Jensen et al. | |
| 2003/0056826 A1 | 3/2003 | Thomas | |
| 2003/0062087 A1 | 4/2003 | Burns et al. | |
| 2005/0199103 A1 | 9/2005 | Thompson et al. | |
| 2006/0081094 A1 | 4/2006 | Ludwig et al. | |
| 2006/0087118 A1 | 4/2006 | Andre et al. | |
| 2006/0101576 A1 | 5/2006 | Rhodes | |
| 2006/0200704 A1 | 9/2006 | Takahashi et al. | |
| 2006/0200904 A1 | 9/2006 | Vogel et al. | |
| 2006/0207665 A1 | 9/2006 | Giagni, Jr. et al. | |
| 2006/0243102 A1 | 11/2006 | Vines | |
| 2008/0054210 A1 | 3/2008 | Smith | |
| 2008/0066584 A1 | 3/2008 | Vines | |
| 2008/0133030 A1 | 6/2008 | Marty | |
| 2008/0216611 A1 | 9/2008 | Resnick | |
| 2008/0277003 A1 | 11/2008 | Mueller et al. | |
| 2009/0228871 A1 | 9/2009 | Edwards et al. | |
| 2009/0256348 A1 | 10/2009 | Bors et al. | |
| 2009/0297294 A1 | 12/2009 | Li et al. | |
| 2010/0032943 A1 | 2/2010 | Li et al. | |
| 2010/0098514 A1 | 4/2010 | Silva et al. | |
| 2010/0272503 A1 | 10/2010 | Pitsch et al. | |
| 2011/0073205 A1 | 3/2011 | Marty et al. | |
| 2012/0273075 A1 | 11/2012 | Pitsch et al. | |
| 2013/0048122 A1 | 2/2013 | Hsu et al. | |
| 2013/0220439 A1 | 8/2013 | Pitsch et al. | |

FOREIGN PATENT DOCUMENTS

| | | |
|---|---|---|
| CN | 2012254744 Y | 4/2009 |
| CN | 201512831 | 6/2010 |
| CN | 201593659 U | 9/2010 |
| CN | 102076599 | 5/2011 |
| CN | 102076915 | 5/2011 |
| DE | 102008042231 A1 | 9/2008 |
| EP | 1 134 320 | 9/2001 |
| FR | 2936582 A3 | 9/2008 |
| GB | 980170 | 1/1965 |
| GB | 2463896 A | 3/2010 |
| JP | 8-246521 | 9/1996 |
| JP | 9068292 A | 3/1997 |
| JP | 9-242897 | 9/1997 |
| JP | 10-259625 | 9/1998 |
| JP | 11-200437 | 7/1999 |
| JP | 2001-3408 | 1/2001 |
| JP | 2002-106732 | 4/2002 |
| JP | 2004-251050 | 9/2004 |
| JP | 2006-97336 | 4/2006 |
| JP | 2008-88679 | 4/2008 |
| JP | 2010-7816 | 1/2010 |
| WO | WO-2005/030441 | 4/2005 |
| WO | WO 2008059490 A1 | 5/2008 |
| WO | WO-2009/155529 | 12/2009 |
| WO | WO-2009/158497 | 12/2009 |
| WO | WO-2009/158498 | 12/2009 |

OTHER PUBLICATIONS

Response to first Chinese Office action in Chinese application No. 201210018359.2, filed Feb. 8, 2016 (12 pages).
Second Chinese Office Action and translation thereof in Chinese Application No. 201210018359.2 (counterpart of Parent U.S. Appl. No. 13/328,900), dated Nov. 18, 2015 (7 pages).

(56) References Cited

OTHER PUBLICATIONS

Response to second Chinese Office action and partial translation thereof in Chinese Application No. 201210018359.2 with Chinese claims, filed Mar. 18, 2016 (15 pages).
Chinese Notice of Grant in Chinese Application No. 201210018359.2 (counterpart of Parent U.S. Appl. No. 13/328,900), dated Jun. 20, 2016 and translation thereof (5 pages).
First Mexican Office Action in Mexican Application No. MX/a/2012/001377 (counterpart of Parent U.S. Appl. No. 13/328,900), dated Nov. 10, 2015 (2 pages).
Response to first Mexican Office Action in Mexican Application No. MX/a/2012/001377, filed Jan. 25, 2016 (9 pages).
Second Mexican Office Action in Mexican Application No. MX/a/2012/001377 (counterpart of Parent U.S. Appl. No. 13/328,900), dated Mar. 18, 2016 (2 pages).
Delta 155. (Mar. 15, 2010). Single Lever Widespread Kitchen Faucets,http://s2.lmg-b.com/faucetdirect.com/mediabase/specifications/delta_155dst_insl_1027.pdf; 12 pages.
Elements of Design, Model # ES4461 PX, Product Specification Sheet (Mar. 25, 2009); 1 page.
Herbeau Creations, 3302—'Royale' Widespread Lavatory Set, Product Specification (2003); 1 page.
Pitsch et al., U.S. Office Action dated Oct. 5, 2011, directed to U.S. Appl. No. 12/705,480; 7 pages.
International Search Report dated Jun. 16, 2010, directed to International Application No. PCT/US2010/031168; 3 pages.
International Preliminary Report on Patentability and Written Opinion dated Oct. 25, 2011, directed to International Application No. PCT/US2010/031168; 8 pages.
Office Action dated Sep. 30, 2015, directed to CA Application No. 2,742,301; 3 pages.
Li, U.S. Office Action dated Apr. 11, 2014, directed to U.S. Appl. No. 13/328,900; 13 pages.
Li, U.S. Office Action dated Aug. 29, 2014, directed to U.S. Appl. No. 13/328,900; 21 pages.
Li, U.S. Office Action dated Mar. 12, 2015, directed to U.S. Appl. No. 13/328,900; 19 pages.
Pitsch et al., U.S. Office Action dated Apr. 30, 2014, directed to U.S. Appl. No. 13/594,698; 15 pages.
Pitsch et al., U.S. Office Action dated Dec. 19, 2014, directed to U.S. Appl. No. 13/594,698; 18 pages.
Pitsch et al., U.S. Office Action dated Jun. 25, 2015, directed to U.S. Appl. No. 13/594,698; 19 pages.
Pitsch et al., U.S. Office Action dated Aug. 17, 2016, directed to U.S. Appl. No. 13/594,698; 22 pages.
Pitsch et al., U.S. Office Action dated Mar. 13, 2017, directed to U.S. Appl. No. 13/594,698; 19 pages.
International Search Report and Written Opinion dated Nov. 13, 2012, directed to International Application No. PCT/US2012/052388; 7 pages.
Notice on the First Office Action dated Jun. 23, 2015, directed to CN Application No. 201280040131.1; 25 pages.
Notice on the Second Office Action dated May 16, 2016, directed to CN Application No. 201280040131.1; 25 pages.
Notice on the Third Office Action dated Feb. 3, 2017, directed to CN Application No. 201280040131.1; 18 pages.
Office Action dated Jun. 28, 2016, directed to JP Application No. 2014-527344; 10 pages.
Office Action dated May 9, 2017, directed to JP Application No. 2014-527344; 12 pages.
Office Action dated Jan. 24, 2018, directed to CA Application No. 2,764,001; 5 pages.
Notice on Grant of Patent Right for Invention and Proceeding with the Registration Formalities dated Feb. 6, 2018, directed to CN Application No. 201280040131.1; 5 pages.
Office Action dated Mar. 6, 2018, directed to JP Application No. 2014-527344; 10 pages.
Notice of Allowance dated Jan. 31, 2018, directed to MX Application No. MX/a/2014/002174; 4 pages.
Notice on the Fourth Office Action dated Nov. 1, 2017, directed to CN Application No. 201280040131.1; 6 pages.
Office Action dated Aug. 16, 2017, directed to MX Application No. MX/a/2014/002174; 5 pages.
Office Action dated Apr. 27, 2018, directed to MX Application No. MX/a/2016/010569; 5 pages.

\* cited by examiner

QUICK CONNECTION COUPLING

CROSS-REFERENCE TO RELATED APPLICATIONS

This application is a continuation application of and claims priority under 35 U.S.C. § 120 to U.S. patent application Ser. No. 13/328,900, filed Dec. 16, 2011, entitled, "Quick Connection Coupling," which claims the benefit under 35 U.S.C. § 119(e) to U.S. Provisional Patent Application No. 61/450,221, filed Mar. 8, 2011, entitled "Quick Connection Coupling," the entire disclosures of which are incorporated herein by reference.

BACKGROUND OF THE INVENTION

Field of the Invention

The invention is related to the field of couplings for connecting two conduits, particularly for connecting a conduit of a faucet assembly and a fluid supply line.

Description of Related Art

Designs of couplings for connecting conduits are known in the art and have been used in many industries including chemical processing, petrochemical, automotive, general manufacturing and plumbing. A typical hose coupling design includes a male element and a female element, wherein the male element is threadably connected to the female element. Installation of these types of couplings typically require tools such as wrenches and additional materials such as plumbing tape. The couplings also require substantial installation time, and there is sometimes difficulty in installing such couplings in tight areas. Failure to properly install can then lead to leakage.

Couplings designed for quick connection and disconnection are also known in the art. A typical quick connection coupling includes a male element and a female element. The female element typically also includes a latch actuated by an internal or external spring. Once the male element is inserted into the female element, the spring-actuated latch contacts a ledge on the male element, thus locking the coupling. Installation of this type of coupling often requires adding pressure to the female element to actuate the internal or external spring which is particularly difficult when installing a coupling in the small space beneath a kitchen or bathroom sink. Further, it is difficult to confirm that the spring-actuated latch has lockingly engaged with the male element often resulting in ineffective installation and subsequent leakage.

Examples of quick connection coupling designs are described in the following patents and patent publication. U.S. Pat. No. 6,231,089 describes a coupling design that includes a female element, a male element and a sliding clip member. The clip member includes a handle that must be depressed to lock the male element and the female element of the coupling together. U.S. Pat. No. 6,786,516 includes a coupling design with a sleeve-type locking piece slidably attached to the coupling for securing the threaded male and female elements of the coupling. The sleeve-type locking piece may be squeezed for effective securing or disconnecting the threaded male and female elements of the coupling. U.S. Pat. No. 6,672,628 also describes a coupling design with a sleeve-type locking piece. The locking piece described in the patent includes two sleeve halves detached from the coupling. The sleeve halves are clasped together over the male and female elements of the coupling to secure the connection. U.S. Patent Publication No. 2010/0032943A1 describes a quick connection coupling design that includes a male section, a sleeve and a fitting body. The coupling described in the application functions by first inserting and securing the sleeve in an expanded section of the fitting body. The male section is then inserted into the secured sleeve where a large diameter portion of the male section is wedged in a space between the sleeve and the fitting body. The coupling is designed for a three-way connection between a faucet and two water valves and thus includes a branched structure.

Accordingly, while many quick connection designs have been developed to address issues with traditional couplings, there is still a need in the art for a quick connection coupling designed for easy and safe installation and removal which can improve on the art to date. It would be advantageous for the coupling design to provide user feedback that the male and female elements of the coupling have been effectively locked. It would also be advantageous to have such a coupling with a minimal number of working pieces, that is economical to make, does not require tools, and can be quickly installed within the small and awkward locations under a kitchen or bathroom sink where faucet assemblies and other plumbing fixtures are installed or in other areas where coupling installation is physically challenging to the user.

BRIEF SUMMARY OF THE INVENTION

The invention includes a coupling that comprises a female section that may include comprising a conduit connecting end and a retainer having an end comprising at least one projection; a male section comprising a conduit connecting end and a male projecting portion having a first large diameter section and a second large diameter section, each having an inwardly facing surface wherein the inwardly facing surfaces of the first and second large diameter sections define a channel, and the channel is configured so that a mating surface on the at least one projection contacts the inwardly facing surface of the first large diameter section when the coupling is in a locked position; and a locking piece positioned on the female section and capable of sliding along the female section so as to engage the at least one projection when situated in the channel such that the mating surface on the at least one projection contacts the inwardly facing surface of the first large diameter section of the male section and the locking piece retains the at least one projection in position and thereby releasably locks the female section and the male section together.

The channel of the coupling may be an annular channel, the top surface of the retainer and the inwardly facing surface of the second large diameter section of the male projecting portion may form a space, and the locking piece may include an inner surface comprising at least one bead thereon which is capable of being positioned in the space when the coupling is in a locked position having the locking piece thereon. The bead is preferably an annular bead.

In addition, the channel of the coupling may be an annular channel, the top surface of the retainer and the inwardly facing surface of the second large diameter section of the male projecting portion may form a space, and the locking piece may include an inner surface comprising at least one annular groove for housing a seal capable of being positioned in the space when the coupling is in a locked position having the locking piece thereon. The seal may comprise a polymeric or elastomeric material and is preferably an o-ring or a gasket.

The locking piece may also have an inner surface with threads thereon which are capable of threadably connecting to mating threads on an exterior surface of the male section. The retainer of the coupling may also comprise a plurality of projections.

The male section, the female section and/or the locking piece of the coupling may comprise a polymeric or polymeric composite material, a metal, or a metal alloy. The male section and locking piece are preferably comprised of brass and the female section is preferably comprised of polyethylene.

The invention also includes a conduit assembly with a first conduit having a connecting end; a second conduit having a connecting end; and a coupling joining the conduit connecting ends together that may have the features noted above. The first conduit and second conduit may include a hose, a tube, or a pipe. The conduit assembly is preferably a hose for supplying fluid to a faucet.

The invention further includes a method for coupling conduits, comprising: connecting a female section of a coupling to a first conduit wherein the female section comprises a conduit connecting end, a retainer having an end comprising at least one projection, and a locking piece slidably situated thereon; connecting a male section to a second conduit wherein the male section comprises a conduit connecting end and a male projecting portion having a first large diameter section and a second large diameter section, each having an inwardly facing surface wherein the inwardly facing surfaces of the first and second large diameter sections define a channel, and the channel is configured so that a mating surface on the at least one projection contacts the inwardly facing surface of the first large diameter section when the coupling is in a locked position; inserting the male section into the female section so the at least one projection is aligned with the channel on the male projecting portion; and moving the locking piece along the female section to engage the at least one projection when situated in the channel such that the mating surface on the at least one projection contacts the inwardly facing surface of the first large diameter section of the male section, and the locking piece retains the at least one projection in position and thereby releasably locks the female section and the male section together and couples the first conduit to the second conduit.

The method may also include the steps of moving the locking piece along the female section away from the male section so that the male section can be separated from the female section; and separating the male section from the female section. Also, the method may include a retainer comprising a plurality of projections. The method may also include a locking piece that has a threaded inner surface and an exterior surface of the male section that has mating threads and further comprise threadably connecting the mating threads on the exterior surface of the male section to the threaded inner surface of the locking piece.

The invention further includes a faucet assembly, comprising a faucet portion with at least one conduit with a connecting end; a fluid supply portion with at least one conduit with a connecting end; and a coupling joining the faucet portion conduit connecting end with the fluid supply portion conduit connecting end that may have the features as noted above. The faucet assembly may be a kitchen or bathroom faucet, and the channel of the coupling of the faucet assembly may be an annular channel.

BRIEF DESCRIPTION OF THE SEVERAL VIEWS OF THE DRAWING(S)

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

DETAILED DESCRIPTION OF THE INVENTION

As used herein, words such as "inner" and "outer," "upper" and "lower," "interior" and "exterior," and "right" and "left" and words of similar import are intended to be used to understand the invention better in conjunction with the drawings attached hereto and to have their ordinary meaning when referring to directions in the drawings. They are not intended to be limiting. Likewise, the invention is described herein in a preferred embodiment with respect to use for connecting a fluid supply hose to a faucet, however, it will be understood from this disclosure that the coupling of the invention may be used in a variety of applications requiring a coupling for connecting conduits such as connecting a fluid supply or drain hose to a washing machine, water softener, or refrigerator, connecting additional hose lengths to a garden hose, connecting a chemical supply hose to a process pump or tank, etc.

The coupling of the invention provides the desired features noted in the background and fulfills a need in the art for such features. It can be quickly, easily, and safely installed without tools particularly in the small space beneath a kitchen or bathroom sink. Further, the coupling is designed to provide user feedback including tactile and/or audible feedback that the coupling is safely locked. The coupling is also easy to remove.

A first embodiment of the coupling and conduit assemblies of the invention are illustrated on FIGS. 1-3g. FIGS. 1-3g show a coupling 10 with a male section 12, a female section 14, and a locking piece 16. The male section 12 includes a male projecting portion 18 and a conduit connecting end 20. The female section 14 includes a retainer 22 and a conduit connecting end 24. A locking piece 16 is also included to secure the connection between the male projecting portion 18 and the retainer 22. FIGS. 2 and 3a-3c show a conduit assembly 11 having coupling 10, a first conduit 26 and a second conduit 28. The conduits include respective connecting ends 30 and 32 for connection to the conduit connecting end 20 of the male section 12 and the conduit connecting end 24 of the female section 14 of the coupling 10, respectively.

As shown on FIGS. 1-3c, the male section 12 includes a male projection portion 18 and a conduit connecting end 20. As shown, the male projecting portion 18 is generally cylindrical with varied diameter sections along its length. Other outer shapes are contemplated herein, such as generally rectangular, triangular, or polygonal (such as hexagonal for tool gripping). The inner surface 36 of the male projecting portion 18 forms a part of the fluid pathway 38 through the coupling 10 when installed. The outer surface 40 of the male projecting portion 18 as shown on FIGS. 2 and 3a-3c includes a first channel 42 and a second channel 44, which are preferably annular channels. A seal 46 is positioned in the first channel 42 to prevent fluid leakage from the fluid pathway 38 of the coupling 10. Additional channels with associated seals may be included for more effective leak prevention, if desired. The seal 46 is preferably an o-ring or gasket and may be made of any suitable polymeric material such as a thermoplastic or elastomer, and may be formed of bacterial resistant material or other materials, but is preferably flexible and elastomeric for ease of use, good sealing and ease of replacement. Preferably, the seal 46 includes one or more of the following materials or combinations and/or copolymers thereof: neoprene, silicone, ethylene propylene diene monomer, silicone rubber, natural rubber, nitrile rubber, styrene-ethylene-butylene-styrene (SEBS)-based thermoplastic elastomer, polytetrafluoroethylene, and/or fluoroplastics or fluoroelastomers. Composites of these materials may also be used.

The male projection portion 18 of the coupling 10 also includes a first large diameter section 52 with an inwardly facing surface 53 and a second large diameter section 54 with an inwardly facing surface 55 wherein the inwardly facing surfaces form the second channel 44. As shown, the channel preferably extends annularly around the device to provide the best locking as described herein. However, a partial or discontinuous channel may also be used. At least one projection 60 located on the end of the retainer 22 is positioned in the second channel 44 when the coupling 10 is in the locked position. As shown on FIGS. 3a-3c, the length $l_1$ of the second channel 44 is preferably greater than the length $l_2$ of the at least one projection 60 located on the end of the retainer 22 so that the projection 60 can be positioned in the channel 44 when the coupling 10 is locked. The length $l_1$ preferably ranges from about 5 mm to about 7 mm, and the length $l_2$ preferably ranges from about 4 mm to about 6 mm. Further, the top surface 61 of the retainer 22 and the inwardly facing surface 55 of the second large diameter section 54 form a space 62 when the projection 60 is positioned in the channel 44. As shown on FIG. 3c, the locking piece 16 may include a preferably annular bead 64 along its inner surface 66 that can be positioned in the space 62 when the coupling 10 is in the locked position to allow for releasably locking the coupling 10.

Figure 3A:
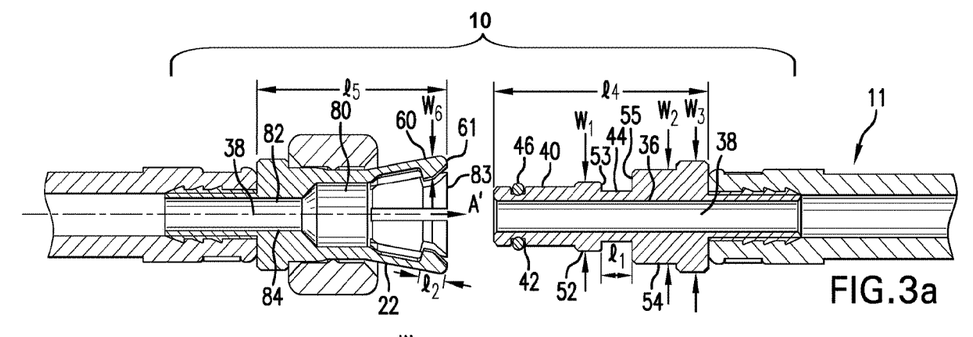
FIG. 3a is a longitudinal, enlarged, partial cross-sectional view of the conduit assembly of FIG. 2, wherein the male and female sections of the coupling are separated.
Figure 3B:
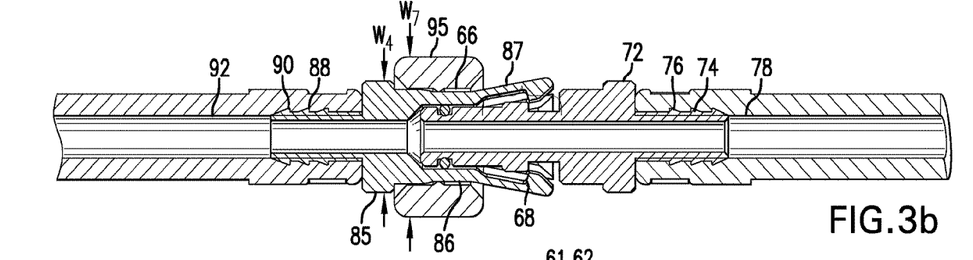
FIG. 3b is longitudinal, enlarged, partial cross-sectional view of the conduit assembly of FIG. 2, wherein the male and female sections of the coupling are engaged.
Figure 3C:
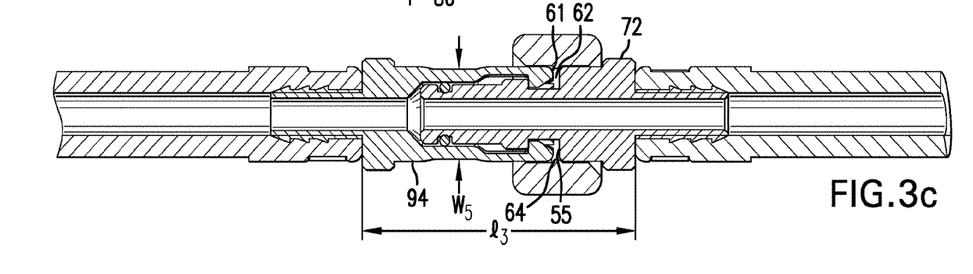
FIG. 3c is a longitudinal, enlarged, partial cross-sectional view of the conduit assembly of FIG. 2, wherein the male and female sections of the coupling are engaged and the coupling is locked.
Figure 3D:
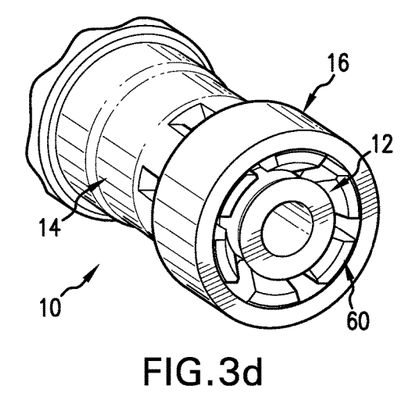
FIG. 3d is a perspective, cross-sectional view of the coupling of FIG. 3c taken along line 3d-3d.
Figure 3E:
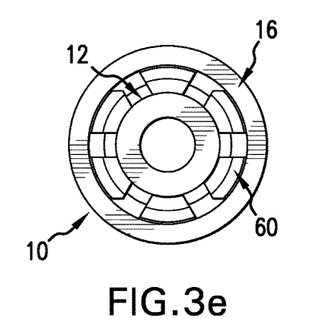
FIG. 3e is a front elevation plan view of the cross-section of FIG. 3d.
Figure 3F:
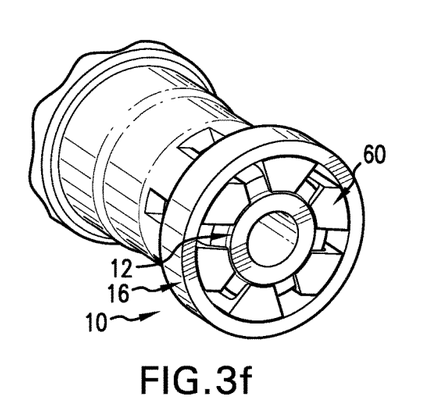
FIG. 3f is a perspective, cross-sectional view of the coupling of FIG. 3c taken along line 3f-3f.
Figure 3G:
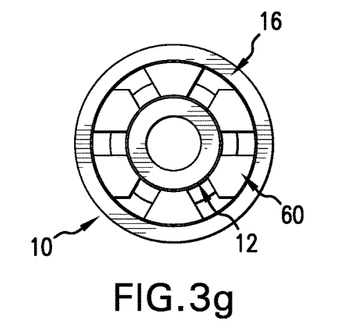
FIG. 3g is a front elevation plan view of the cross-section of FIG. 3f.

The first large diameter section 52 of the male section can be a variety of sizes, but the width $w_1$ as measured across the section should be large enough so that the mating surface 68 on the retainer projection 60 can be secured against the inwardly facing surface 53 of this section when the coupling 10 is in the locked position as shown on FIG. 3c. The inwardly facing surface 53 of the first large diameter section 52 may be level or uneven to accommodate any style of retainer projection 60. For example, the inwardly facing surface 53 may include an elevated section to accommodate a hook-shaped retainer projection 60. It may also be formed so that it is sloped. The second large diameter section 54 can also be a variety of sizes, but the width $w_2$ of the second large diameter section 54 should be small enough so that the locking piece 16 can be positioned over the second large diameter section 54 when the coupling 10 is in a locked position as shown on FIG. 3c. The width $w_1$ preferably ranges from about 10 mm to about 12 mm, and the width $w_2$ preferably ranges from about 13 mm to about 15 mm.

The male projecting portion 18 of the invention further includes a third large diameter section 72. The third large diameter section 72 can also be a variety of sizes, but the width $w_3$ of this section should be large enough to provide a barrier to prevent the locking piece 16 from sliding onto the conduit 26 when the coupling 10 is in the locked position. The width $w_3$ preferably ranges from about 16 mm to about 18 mm.

Figure 1:
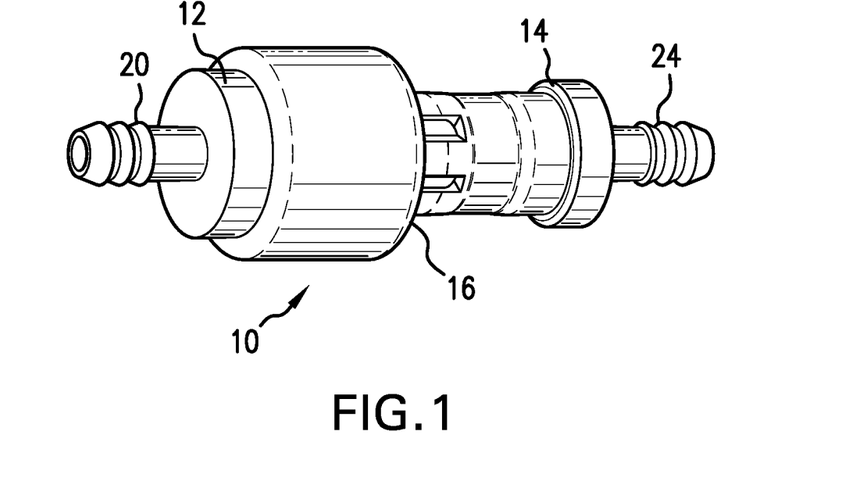
FIG. 1 is a perspective view of one embodiment of a coupling according to the invention in the locked position.
Figure 2:
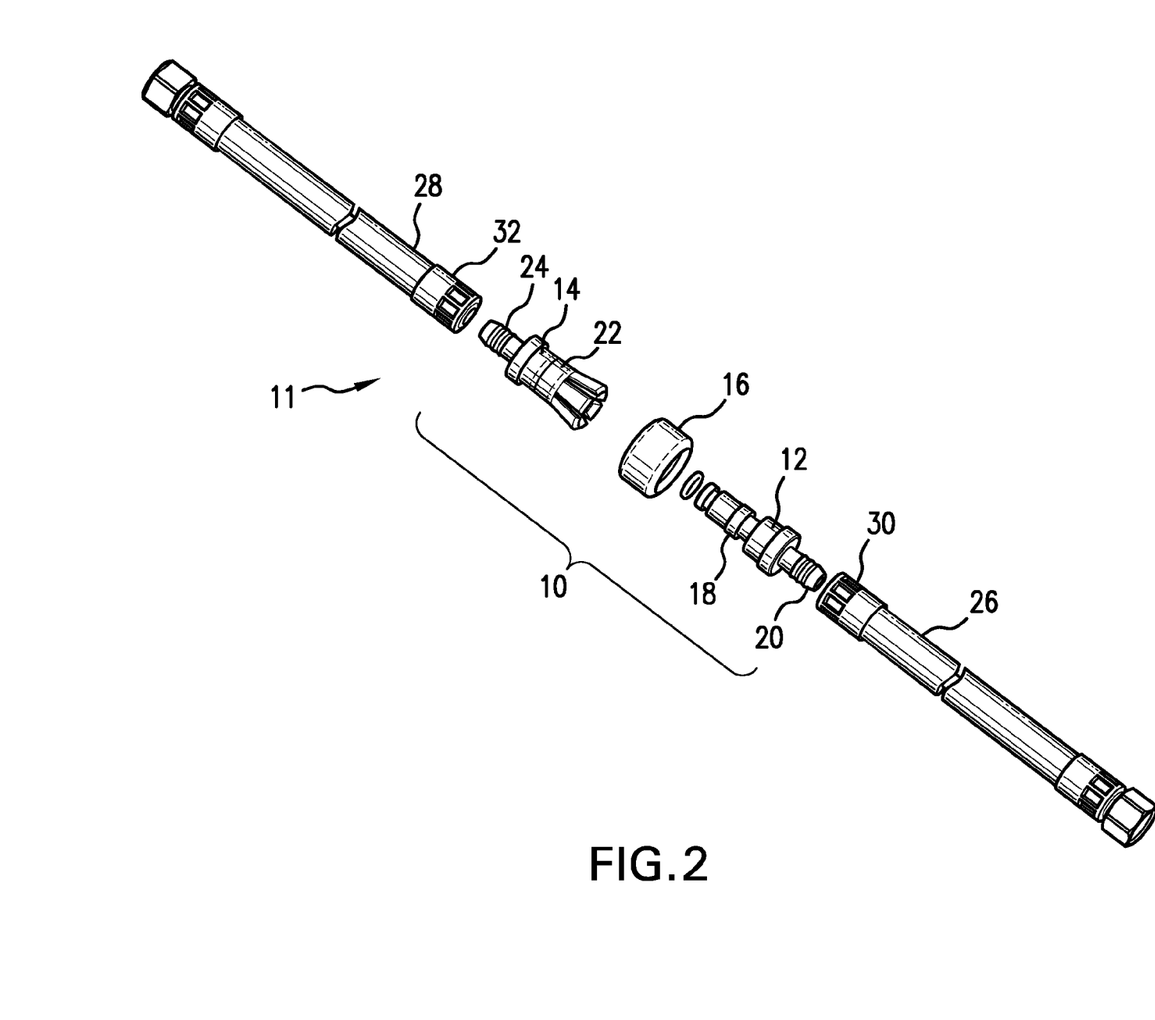
FIG. 2 is an exploded view of a conduit assembly according to the invention having a coupling of FIG. 1 and two conduits for attachment thereto.

The male section 12 further includes a conduit connecting end 20 designed to connect the coupling 10 to the connecting end 30 of the first conduit 26. The conduit connecting end 20 of male section 12 may be designed to accommodate a conduit 26 with any type of connecting end 30. FIGS. 2-3c show a "hose-barb" type of conduit connecting end 20 with a plurality of ridges 74 that can be inserted into the first conduit 26 wherein the outer surfaces 76 of the ridges 74 are in contact with the inner surface 78 of the first conduit 26. Alternate types of conduit connecting ends 20 may include but are not limited to flanged or threaded to accommodate the first conduit 26 with a threaded or flanged connecting end 30, ferrules and the like.

The female section 14 is shown on FIGS. 1-3c and includes a retainer 22 and a conduit connecting end 24. The retainer 22 is generally cylindrical with varied diameter sections. The inside of the retainer 22 includes a first generally cylindrical core 80 sized to allow for insertion of the male projection portion 18 as shown in FIGS. 3a-3b. The inside of the retainer 22 also includes a second generally cylindrical core 82 with an inner surface 84 that forms a part of the fluid pathway 38 through the coupling 10 when installed. It should be understood that while a preferred cylindrical shape is shown, any shape which accepts or is complimentary to the male projecting portion is acceptable.

The retainer 22 preferably includes a first large diameter section 85, a retainer base 86, and a retaining section 87. The first large diameter section 85 can be a variety of sizes, but the width $w_4$ of this section should be large enough to provide a barrier to prevent the locking piece 16 from sliding onto the conduit 28 when the coupling 10 is in the unlocked position. The retainer base 86 can also be a variety of sizes, but the width $w_5$ of the retainer base 86 should be small enough such that the locking device 16 can be positioned on the retainer base 86 when the coupling 10 is in the unlocked position. The width $w_4$ preferably ranges from about 16 mm to about 18 mm, and the width $w_5$ preferably ranges from about 13 mm to about 14 mm. The retaining section 87 preferably includes a plurality of subsections 83 spaced from one another and extending axially from the retainer base 86 as shown on FIGS. 3a-3c. The retaining section 87, however, may also be constructed of a single piece. The retaining subsections 83 preferably have outer surfaces that extend outwardly from the retainer axis A-A' as shown in the drawings and are preferably integrally formed with the retainer base. The end of the retaining section 87 includes at least one projection 60 having an inwardly extending portion directed towards the retainer axis A-A'. Preferably, the retainer 22 includes about 4 to about 6 projections, but more or less can be used as desired.

When the coupling 10 is locked, the mating surface 68 of the retainer projection 60 contacts the first inwardly facing surface 53 of the first large diameter section 52 of the male section 12. The retainer projections 60 shown on FIGS. 2 and 3a-3e are wedge-shaped, but they may be shaped in any manner including a hook, a rectangle, a square, a triangle, a circle, or combinations thereof. The width $w_6$ of the retainer projections varies, but should be large enough to such that mating surface 68 contacts and/or interacts with the first inwardly facing surface 53 of the first large diameter section 52 of the male section when the coupling is locked. The width $w_6$ preferably ranges from about 15 mm to about 17 mm.

The female section 14 further includes a conduit connecting end 24 designed to connect the coupling 10 to the connecting end 24 of the second conduit 28. The conduit connecting end 32 of female section 14 may be designed to accommodate a conduit 28 with any type of connecting end 32. FIGS. 2-3c show a "hose-barb" type of conduit connecting end 24 with a plurality of ridges 88 that can be inserted into the second conduit 28 wherein the outer surfaces 90 of the ridges 88 are in contact with the inner surface 92 of the second conduit 28. Alternate types of conduit connecting ends 24 may include but are not limited to flanged or threaded to accommodate the second conduit 28 with a threaded or flanged connecting end 32, ferrules and the like. The conduit connecting end 24 may be the same or different from the conduit connecting end 20.

The coupling also includes a locking piece 16 designed for simple and easy locking of the coupling 10 without tools. The locking piece 16 is preferably generally cylindrical with an inner surface 64 that is configured to slidably engage and be situated on the outer surface 94 of the retainer 22. The outer surface 95 of the locking piece 16 may be smooth or rough to facilitate gripping the locking piece 16. It may also be shaped so as to have flat surfaces (such as hexagonally shaped) for optional tools or better hand gripping. In the embodiment shown on FIGS. 1-3c, the inner surface 66 of the locking piece 16 also includes a preferably annular bead 64. After the male projecting portion 18 is inserted into the retainer 22, the locking piece 16 can be moved along the coupling 10 so that the mating surface 68 of at least one retainer projection 60 is in contact with the inwardly facing surface 53 of the first large diameter section 52 of the male projecting portion 18 and thereby locks the coupling 10. When the coupling 10 is in the locked position, the preferably annular bead 64 on the inner surface 66 of the locking piece 16 is situated in the space 62 formed by the top surface 61 of the retainer 14 and the inwardly facing surface 55 of the second large diameter section 54.

The locking piece 16 advantageously provides user feedback when the coupling 10 is in the locked position. For example, the horizontal movement of the locking piece 16 is restricted once the preferably annular bead 64 is situated in the space 62 thus providing tactile feedback to the user that the coupling has been adequately secured. Further, an audible sound is typically emitted when the preferably annular bead 64 becomes situated in the space 62, thus providing additional user feedback that the coupling is secure. A further advantage of this coupling design is the ease at which the coupling 10 can be locked by simply sliding the locking piece 16 along the coupling 10.

The male section 12, female section 14, and locking piece 16 of the coupling 10 may be formed using a variety of materials, such as, for examples, metals and metal alloys (e.g., copper, brass, nickel, lead, titanium, stainless steel, etc.) as well as polymeric or hard rubber materials (e.g., polystyrene-butadiene-styrenes (SBS), polyacrylonitrile-butadiene-styrenes (ABS), polyamides (PA), polyimides (PI), polyarylenes (polyetherether ketone (PEEK), polyether ketone (PEK), polyether ketone ketone (PEKK) and the like), polyethylene sulfones (PES), polyetherimides (PEI), polytetrafluoroethylene (PTFE), fluoroplastics (FEP and PFA), olefinic rubbers, polyethylenes (PE), polypropylenes (PP), polyvinylchloride (PVC), polyoxyalkylenes (i.e., polyacetals) such as polyoxymethylenes (POM), polyoxyethylenes (POE), polyoxybutylenes (POB), etc., styrene-maleic-anhydrides (SMA)), and other similar molding materials, composites, blends and/or copolymers of these materials, provided the materials provide adequate strength and preferably surface qualities and properties to function as components of a fluid coupling. Composite materials may include fibrous and particulate materials such as glass fibers, carbon fibers, aramid fibers, Kevlar®, mica, carbon powder, and other fillers known in the art. The male section 12 and locking piece 16 are preferably formed of a composite material including PA reinforced with glass fiber, more preferably PA reinforced with about 33% glass fiber, and the female section 14 is preferably formed of POM.

The coupling 10 is preferably sized so as to be compact and have fewer working parts resulting in easy installation in the small space beneath a sink, while still, surprisingly, effectively coupling a conduit such as a fluid supply hose. Preferably, in one embodiment herein, the coupling 10 is about 40 mm to about 50 mm in length $l_3$, when measured longitudinally along the coupling in a locked position from the end of the first large diameter section 84 of the female section 14 to the end of the third large diameter section 72 of the male section 12. The length $l_4$ of the male projecting portion 18 in one embodiment herein is preferably about 34 mm to about 40 mm measured from the one end of the male projecting portion 18 to the end of the third large diameter section 72 of the male section. The length $l_5$ of the retainer 22 in one embodiment herein is preferably about 30 mm to about 35 mm measured from one end of the retainer to the end of the first large diameter section 85 of the retainer 22. The width $w_7$ of the locking piece 16 in one embodiment herein is about 16 mm to about 18 mm.

Figure 4A:
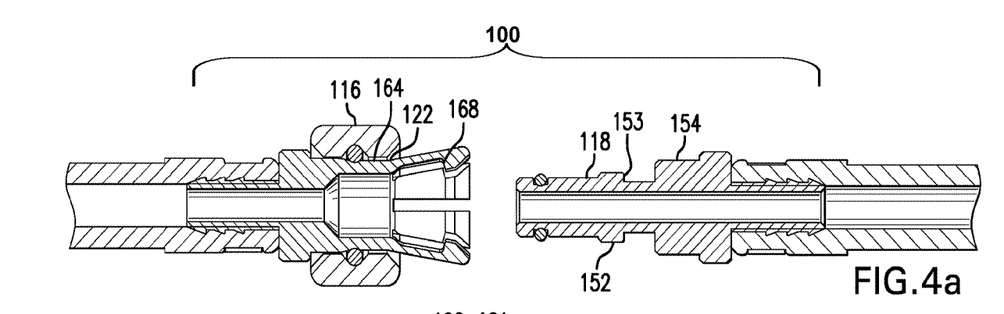
FIG. 4a is a longitudinal, enlarged, partial cross-sectional view of a second embodiment of a conduit assembly having an alternative coupling according to the invention, wherein the male and female sections of the coupling are separated.
Figure 4B:
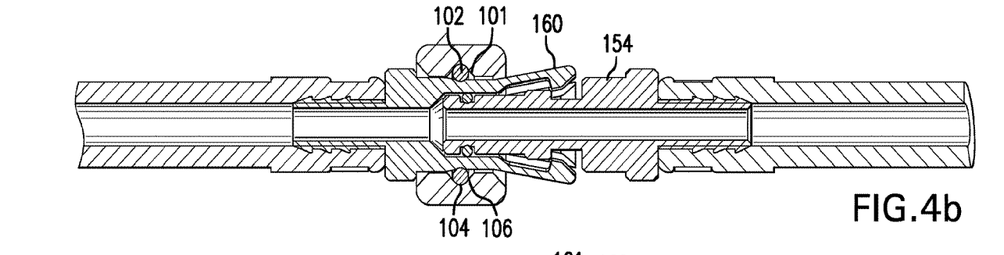
FIG. 4b is a longitudinal, enlarged, partial cross-sectional view of the embodiment of the conduit assembly of FIG. 4a, wherein the male and female sections of the coupling are engaged.
Figure 4C:
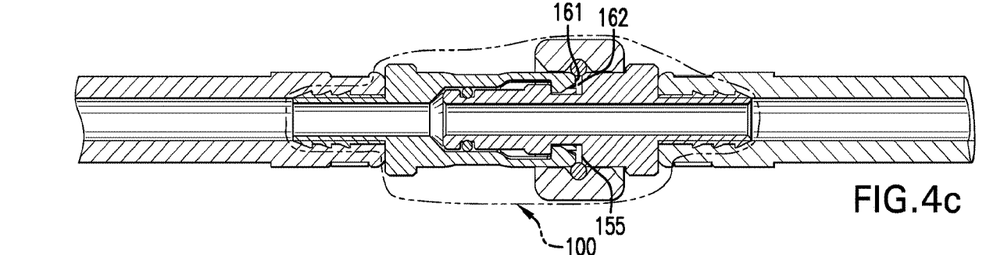
FIG. 4c is a longitudinal, enlarged, partial cross-sectional view of the embodiment of the conduit assembly of FIG. 4a, wherein the male and female sections of the coupling are engaged and the coupling is locked.

A second embodiment of the coupling and conduit assemblies of the invention are illustrated on FIGS. 4a-4c. The coupling 100 is shown wherein analogous reference numbers refer to parts similar to or the same as those described above and identified for the embodiment of FIGS. 1-3c. The coupling 100 is as described in the first embodiment, except the coupling 100 does not include the preferably annular bead 64 on the inner surface 66 of the locking piece 16 from FIGS. 3a-3c. Instead, the inner surface 164 of the locking piece 116 of coupling 100 includes a preferably annular groove 101 and a seal 102 with an outer surface 104 that is in contact with the surface 106 of the preferably annular groove 101. The seal 102 is preferably an o-ring or gasket and may be made of any suitable polymeric material such as a thermoplastic or elastomer, and may be formed of bacterial resistant material or other materials, but is preferably flexible and elastomeric for ease of use, good sealing and ease of replacement. Preferably, the seal 102 includes one or more of the following materials or combinations and/or copolymers thereof: neoprene, silicone, ethylene propylene diene monomer, silicone rubber, natural rubber, nitrile rubber, styrene-ethylene-butylene-styrene (SEBS)-based thermoplastic elastomer, polytetrafluoroethylene, and/or fluoroplastics or fluoroelastomers. Composites of these materials may also be used.

This embodiment also includes a locking piece 116 designed for simple and easy locking of the coupling 100. Similar to the first embodiment, after the male projecting portion 118 is inserted into the retainer 122, the locking piece 116 can be moved along the coupling 100 so that the mating surface 168 of the at least one retainer projection 160 is in contact with the inwardly facing surface 153 of the first large diameter section 152 of the male projecting portion 118 and thereby locking the coupling 100. When the coupling 100 is in the locked position, the seal 102 is situated in the space 162 formed by the top surface 161 of the retainer 122 and the inwardly facing surface 155 of the second large diameter section 154.

The locking piece 116 advantageously provides user feedback when the coupling 100 is in the locked position. For example, the horizontal movement of the locking piece 116 is restricted once the seal 102 is situated in the space 162 thus providing tactile feedback to the user that the coupling has been adequately secured. A further advantage of this coupling design is the ease at which the coupling 100 can be locked by simply sliding the locking piece 116 along the coupling 100.

Figure 5A:
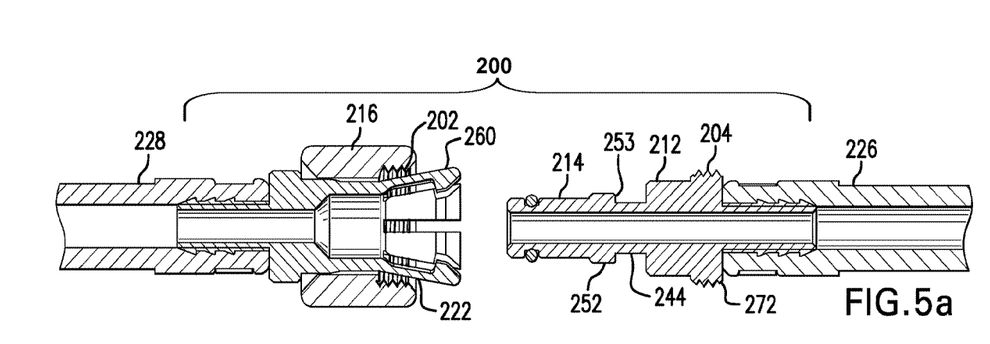
FIG. 5a is a longitudinal, enlarged, partial cross-sectional view of a further embodiment of a conduit assembly having an alternative coupling according to the invention, wherein the male and female sections of the coupling are separated.
Figure 5B:
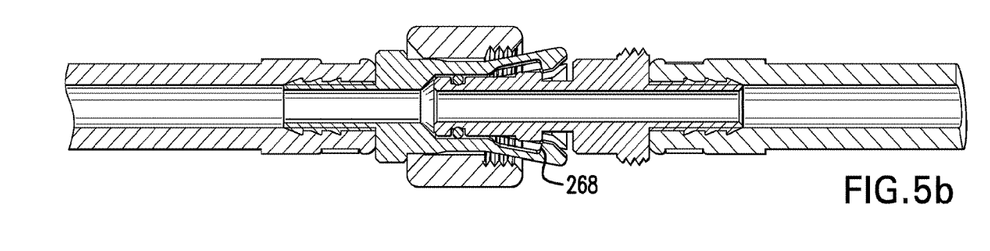
FIG. 5b is a longitudinal, enlarged, partial cross-sectional view of the embodiment of the conduit assembly of FIG. 5a, wherein the male and female sections of the coupling are engaged.
Figure 5C:
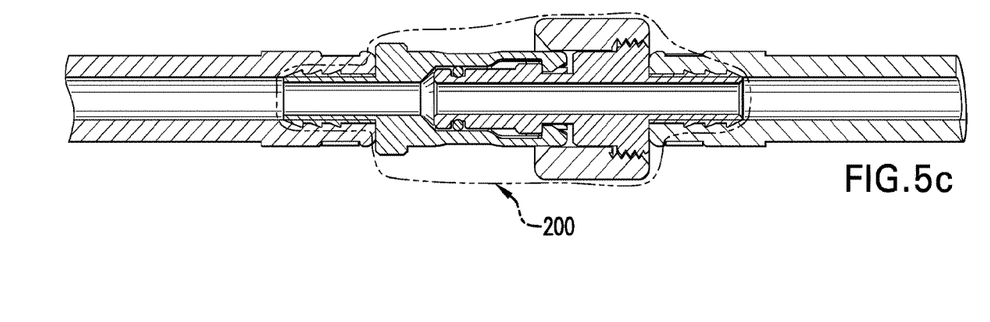
FIG. 5c is a longitudinal, enlarged, partial cross-sectional view of the embodiment of the conduit assembly of FIG. 5a, wherein the male and female sections of the coupling are engaged and the coupling is locked.
Figure 6:
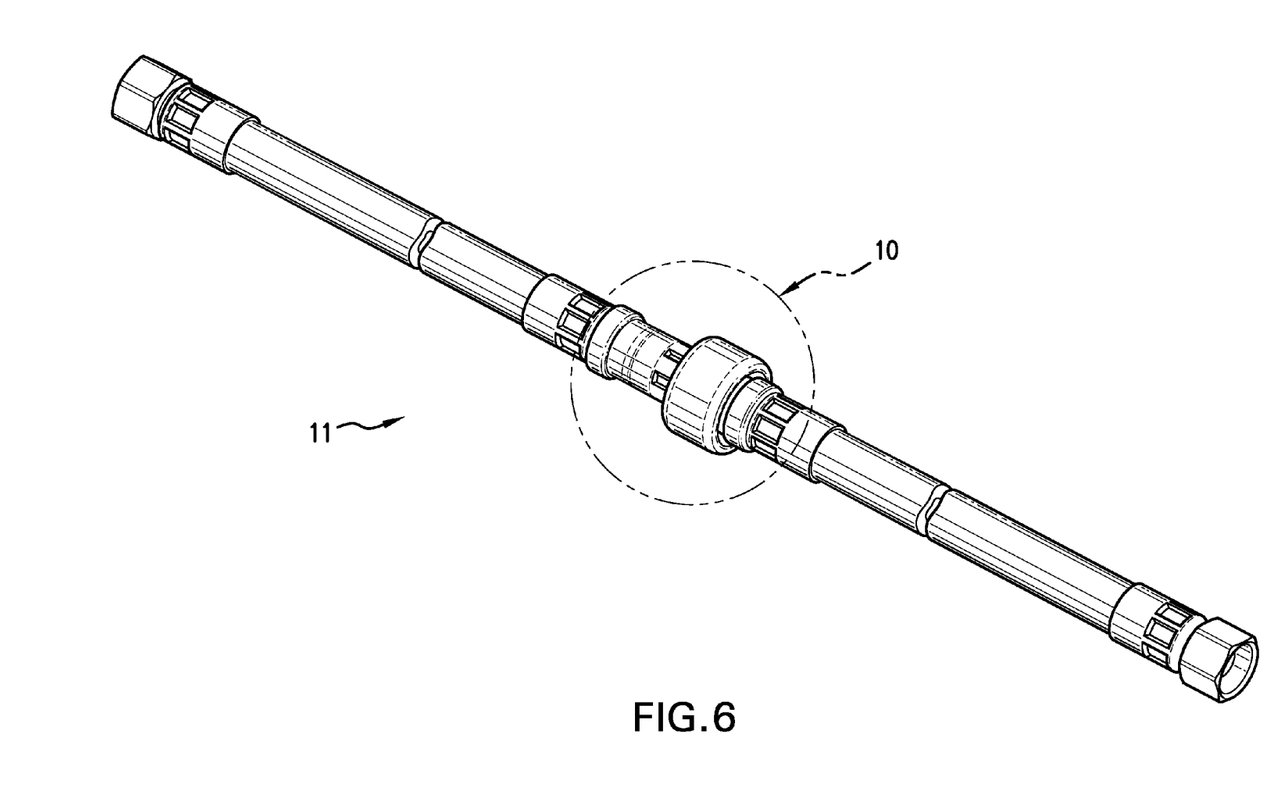
FIG. 6 is a perspective view of the conduit assembly of FIG. 2, wherein the coupling is locked.

A further embodiment of the coupling and conduit assemblies of the invention is illustrated on FIGS. 5a-5c. The coupling 200 is shown wherein analogous reference numbers refer to parts similar to or the same as those described above and identified for the embodiments of FIGS. 1-4c. The coupling 200 is as described in the other embodiments, except the inner surface 202 of the locking piece 216 is threaded and does not include the preferably preferably annular bead 64 from FIGS. 3a-3c or the preferably annular groove 101 and seal 102 from FIGS. 4a-4c. Further, the third large diameter section 204 of the male projecting portion 214 is threaded and sized so it can be threadably attached to the mating threads of the inner surface 202 of the locking piece 216 thus locking the coupling 200.

In this embodiment, after the male projecting portion 214 is inserted into the retainer 222, the locking piece 216 can be moved along the coupling 200 so that the mating surface 268 of the at least one retainer projection 260 is in contact with the inwardly facing surface 253 of the first large diameter section 252 of the male projecting portion 214. The inner surface 202 of the locking piece 216 can then be threadably connected to the mating threads on the third large diameter section 204. This coupling can also be easily installed and locked.

The invention further includes a conduit assembly 11. As shown on FIGS. 2-6, the conduit assembly 11 may include a first conduit 26 and a second conduit 28, wherein the conduits are connected via at least one coupling described hereinabove such as coupling 10, 100 or 200. As such couplings are described in detail above, they are not further described herein. The conduits 26 and 28 include but are not limited to hoses, tubes, or pipes or any combination thereof. The conduits may be any suitable material such as plastic, rubber, metal or metal alloy. The conduits are preferably hoses and more preferably hoses for supplying fluid to a faucet such as a kitchen faucet, a bathroom faucet, etc. The hoses may be braided, reinforced or any combination thereof suitable for supplying fluid to a faucet.

A method for coupling conduits using the coupling described hereinabove such as coupling 10, 100 or 200 is also included herein and is described below with respect to coupling 10 as an example. The method includes first connecting the conduit connecting end 24 of the female section 14 to a second conduit 28 with a conduit connection end 32. The method next includes the step of connecting the conduit connecting end 20 of the male section 12 to a first conduit 26. These initial steps can be completed in any order as long as the male and female sections are installed in the conduits. The conduit connecting ends 26 and 28 may be installed in the associated conduits in any manner including, but not limited to inserting a "hose-barb" type connecting end into a hose and securing the hose barb with a clamp or seal. Preferably, the conduit connection is a "hose-barb" crimped connection. Once the male and female sections are connected to the conduits, the coupling can be closed by inserting the male section 12 into the female section 14 so the at least one projection 60 of the female section 14 is aligned with the second channel 44 on the male projecting portion 18. The coupling can then be locked by moving by sliding motion the locking piece 16 along the female section 14 of the coupling to engage the at least one projection 60 when situated in the second channel 44 and the at least one projection 60 is situated in the channel 44 such that the mating surface 68 of the at least one projection 60 contacts and/or otherwise engages the inwardly facing surface 53 of the first large diameter section 52. The locking piece 16 retains the at least one projection 60 in position and thereby releasably locks the female section 14 to the male section 12 and couples the first conduit 26 and the second conduit 28.

An alternate method for coupling conduits using the coupling 200 is also included herein. The alternate method is generally the same as the method described above but further includes moving in a sliding manner the locking piece 216 having a threaded inner surface 202 along the female section 214 to engage the at least one projection 260 when positioned in the second channel 244 such that the mating surface 268 on the at least one projection contacts the inwardly facing surface 253 of the first large diameter section 252 of the male section 212. The locking piece 216 retains the at least one projection 260 in position by threadably connecting to mating threads on an exterior surface 204 on the third large diameter section 272 of the male section 212 and thereby releasably locks the female section and the male section together and couples the first conduit 226 to the second conduit 228.

Figure 7:
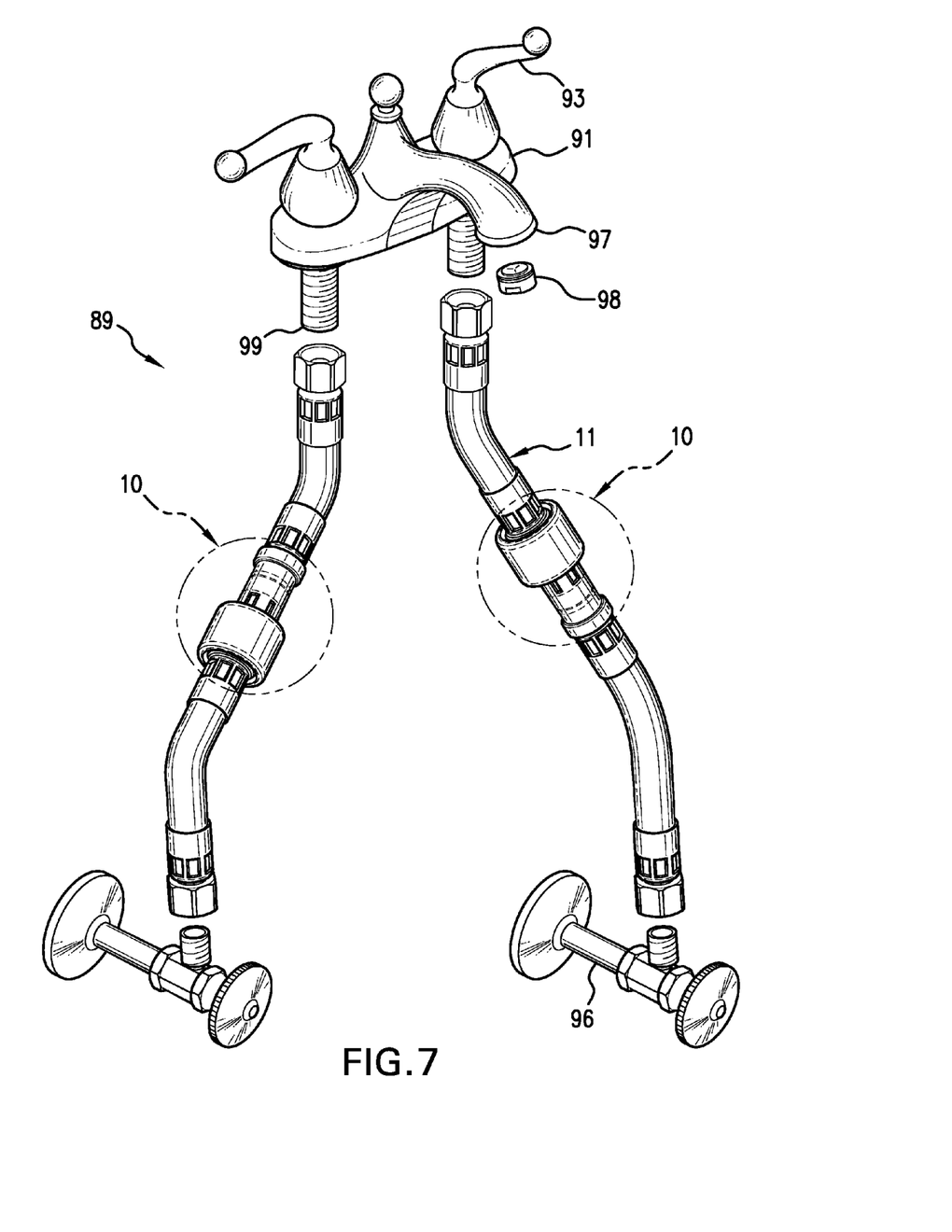
FIG. 7 is a perspective view of a faucet assembly according to the invention having a coupling as in FIG. 1.

A faucet assembly 89 is also included herein as shown in FIG. 7. The faucet assembly 89 may have any of the at least one couplings as described hereinabove, such as coupling 10, 100, or 200. As such couplings are described in detail above, they are not further described herein. As shown for illustrative purposes, the coupling is coupling 10. The assembly includes a faucet portion 91 which has at least one faucet handle 93 and a fluid supply portion 96. As shown, there are two such handles 93, one for hot and one for cold, but single handle faucets may also be included. Similarly, there are two fluid supply portions 96, one for hot and one for cold, but a single fluid supply portion may also be included. One or more coupled conduits 11, which may include for example a flexible hose such as any known in the art, is also provided. As shown, each coupled conduit 11 include two sections, one capable of connection to the threaded shank of the faucet portion 91 and one capable of connection to the threaded shank of the fluid supply portion 96. The faucet and fluid supply connections as shown are threaded but may include other connections such as flanged, quick connect, etc. The two sections of each fluid supply conduit are connected together by a coupling such as coupling 10, 100, or 200. The handle 93 actuates the flow of fluid from the fluid supply portion 96 through the coupled conduit 11 and into the faucet portion 91 having an outlet 97 for fluid at an outlet end 98 and an inlet end 99 for receiving fluid from the coupled conduit 11. The faucet portion 91 may be a kitchen faucet, a bathroom faucet, etc. The quick connect piece herein may also be used in a variety of plumbing and piping configurations such as for industrial use, hand held sprayers, outdoor hoses, eye washers or anywhere a hose quick connect would be useful.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A coupling, comprising:
   a female section comprising a conduit connecting end and a retainer having an end comprising at least one projection having a radially-outward-facing surface;
   a male section comprising a conduit connecting end and a male projecting portion having a radially-outward-facing surface, a first section and a second section, each section having an inwardly facing surface wherein the first and second sections define a channel, the channel is configured so that a mating surface on the at least one projection contacts the inwardly facing surface of the first section when the coupling is in a locked position; and
   a locking piece positioned on the female section when the locking piece is not in the locked position and capable of sliding along the female section so as to engage the at least one projection when situated in the channel such that the mating surface on the at least one projection contacts the inwardly facing surface of the first section of the male section and the locking piece retains the at least one projection in position and thereby releasably locks the female section and the male section together;
   wherein in the locked position, the radially-outward-facing surface of the at least one projection is aligned longitudinally with the radially-outward-facing surface of the second section within the locking piece and a radially-inward-facing surface of the locking piece contacts both the radially-outward-facing surface of the at least one projection and the radially-outward-facing surface of the second section of the male section, and
   wherein the channel is an annular channel, and a top surface of the retainer and the inwardly facing surface of the second section of the male projecting portion form a space, and the radially-inward-facing surface of the locking-piece comprises at least one bead thereon which is capable of being positioned in the space when the coupling is in the locked position.

2. The coupling of claim 1, wherein the bead is an annular bead.

3. The coupling of claim 1, wherein the retainer comprises a plurality of projections.

4. The coupling of claim 3, wherein the retainer comprises 4 to 6 projections.

5. The coupling of claim 1, wherein at least one of the male section, the female section and the locking piece comprises a polymeric or polymeric composite material.

6. The coupling of claim 1, wherein the male section and the locking piece comprise a polyamide with glass reinforcing fiber and the female section comprises a polyoxymethylene.

7. A coupling, comprising:
   a female section comprising at least one projection having a radially-outward-facing surface;
   a male section comprising a first section and a second section, wherein the first and second sections define a channel configured to receive the at least one projection when the coupling is in a locked position; and
   a locking piece configured to slide along the female section so as to engage the at least one projection when situated in the channel such that the locking piece retains the at least one projection in position and thereby releasably locks the female section and the male section together;
   wherein, in the locked position, the radially-outward-facing surface of the at least one projection is aligned longitudinally with a radially-outward-facing surface of the second section within the locking piece and a radially-inward-facing surface of the locking piece contacts both the radially-outward-facing surface of the at least one projection and the radially-outward-facing surface of the second section of the male section, and
   wherein the radially-inward-facing surface of the locking piece comprises at least one bead thereon which is capable of being positioned between the at least one projection and the second section when the coupling is in the locked position having the locking piece thereon.

* * * * *